(12) United States Patent
Accapadi et al.

(10) Patent No.: US 6,711,644 B1
(45) Date of Patent: Mar. 23, 2004

(54) APPARATUS AND METHOD FOR COMMUNICATING THE COMPLETION OF ASYNCHRONOUS INPUT/OUTPUT

(75) Inventors: Mathew Accapadi, Austin, TX (US); Kumar V. Nallapati, Austin, TX (US); Mysore Sathyanaraya Srinivas, Austin, TX (US); James William VanFleet, Austin, TX (US); Nasr-Eddine Walehiane, San Francisco, CA (US); Michael William Wortman, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 595 days.

(21) Appl. No.: 09/627,226

(22) Filed: Jul. 27, 2000

(51) Int. Cl.$^7$ ............................................. G06F 13/24
(52) U.S. Cl. .......................................................... 710/263
(58) Field of Search ................................. 710/112, 263; 709/101

(56) References Cited

U.S. PATENT DOCUMENTS

| | | | | |
|---|---|---|---|---|
| 5,568,180 A | * | 10/1996 | Okamoto | ..................... 725/92 |
| 5,764,915 A | * | 6/1998 | Heimsoth et al. | ........... 709/227 |
| 6,134,585 A | * | 10/2000 | Yamato | ........................ 725/93 |
| 6,243,860 B1 | * | 6/2001 | Holland | ....................... 717/141 |

FOREIGN PATENT DOCUMENTS

JP     11065952 A  *  3/1999  ........... G06F/13/00

OTHER PUBLICATIONS

The Single UNIX Specification, Version 2 1997 Lio$_{13}$ Listio().*
Lio$_{13}$ Listio(3R) Realtime Library. Aug. 19, 1993.*
UNIX man pages:Lio_Listio(3) 1994.*
UNIX man pages: attributes(5) 1994 Updated Feb. 19, 2000.*

* cited by examiner

Primary Examiner—Paul R. Myers
(74) Attorney, Agent, or Firm—Duke W. Yee; Diana L. Roberts; Stephen J. Walder, Jr.

(57) ABSTRACT

An apparatus and method for communicating the completion of asynchronous I/O requests is provided. In particular, the apparatus and method make use of a new function call which is capable of waiting for a predetermined number of I/O requests to be completed prior to returning to the calling application. Control blocks for the I/O requests are updated after a predetermined number of I/O requests have been completed, i.e. in a process context rather than in an interrupt context as in the known systems. In this way, the overhead associated with known asynchronous I/O system calls is reduced.

35 Claims, 6 Drawing Sheets

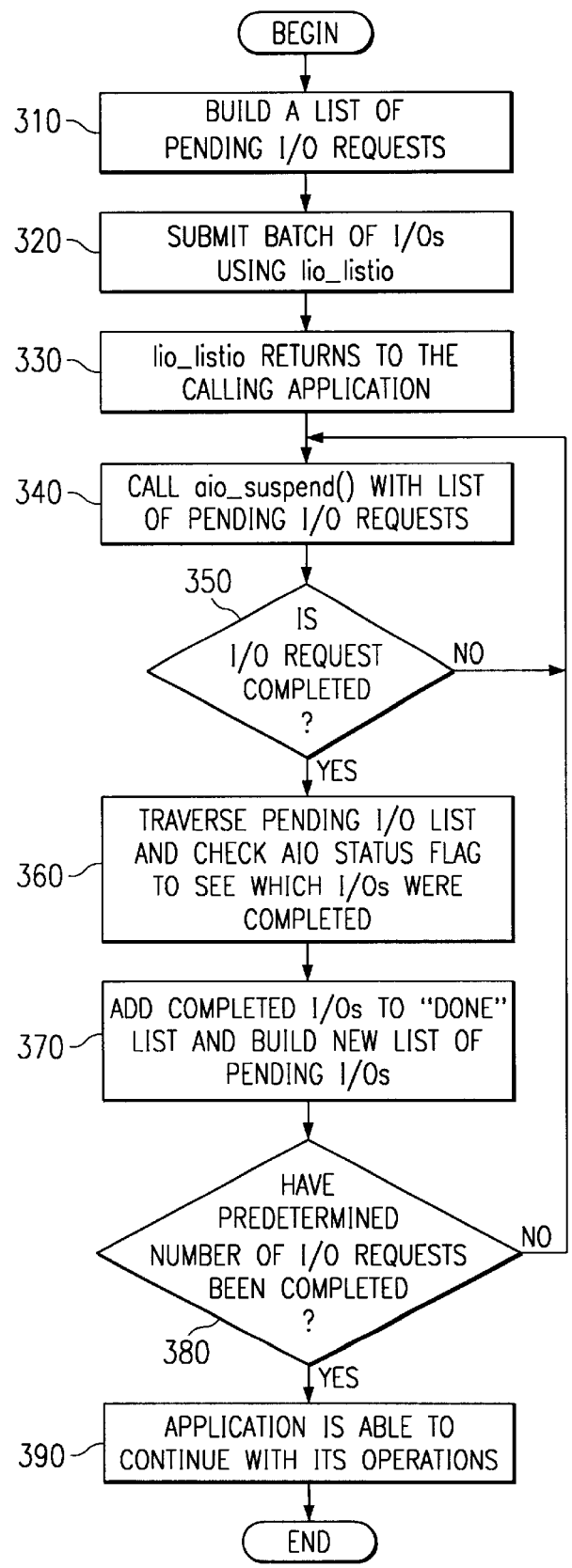

FIG. 7 application calls aio_nwait
aio_nwait() takes as arguments the number of requests to wait on (nwait), a pointer
to a list that will be filled in by the kernel for each request that is completed, and
a count of the maximum number of entries that can be on the list.
check that AIO kernel extension is configured IF aio is not configured THEN
    return error to application
ENDIF validate arguments:

IF nwait < 0 THEN
    return error
ELSE IF nwait > count THEN
    return error
ELSE IF count < 1 THEN
    return error
ELSE IF count > maximum number of system requests
    return error
ENDIF determine thread id of the caller GET thread id use thread id to examine the thread's aio_done field. Compare this aio_done value
to the nwait value.

GET aio_done

If aio_done is less than the latter, then put the calling thread to sleep using kernel
thread wait subroutine IF aio_done < nwait THEN
    thread waits on event
ENDIF The thread wait subroutine returns after aio_done is equal to nwait.

WHILE aio_done < nwait
    thread waits on event
ENDWHILE

Once aio_done is equal to nwait, modify the pointer to the list of control blocks so
that each control block that was done is added to the list.

WHILE aio_done_queue is not empty
    SET list pointer to point to control block that is on done queue
    INCREMENT pointer to aio_done_queue so that it points to the next control block
on the done queue
    INCREMENT list pointer
ENDWHILE copy out this data to user space
wake up application and return control to application

APPARATUS AND METHOD FOR COMMUNICATING THE COMPLETION OF ASYNCHRONOUS INPUT/OUTPUT

BACKGROUND OF THE INVENTION

1. Technical Field

The present invention is directed to an apparatus and method for communicating the completion of asynchronous input/output in a data processing system.

2. Description of Related Art

Portable Operating System Interface for UNIX (POSIX) is an IEEE 1003.1 standard that defines the language interface between application programs and the UNIX operating system. Adherence to the standard ensures compatibility when programs are moved from one UNIX computer to another. POSIX provides a set of system calls for user applications to manage asynchronous input/output requests. In POSIX, the lio_listio( ) function call is used to initiate a group of input/output (I/O) requests. By input/output requests what is meant is a request to perform a read/write operation. The lio_listio( ) function call can either operate in a blocking or non-blocking manner. By "blocking" what is meant is that the lio_listio( ) function call does not return values to the calling application until all of the I/O requests are complete. In a "non-blocking" operation, the lio_listio( ) function call can, in a user mode, poll for completed I/O requests or can issue a call to the aio_suspend( ) function in order to wait on a selected set of I/O requests to be completed.

The selected set of I/O requests that are to be completed is dependent on the particular application that calls the aio_suspend( ) function. For example, many on-line transaction processing middleware applications, such as Oracle database applications, initiate a group of I/O requests and would like to wait until 30% to 50% of the requests are completed. The application would like to continue to process other requests to achieve an enhanced throughput, however, this is not possible with the existing services provided by the POSIX asynchronous I/O system calls.

There are a number of factors that do not allow current POSIX asynchronous I/O system calls to facilitate enhanced throughput of applications. For example, the aio_suspend( ) function requires that the user build a list of control blocks, each associated with an I/O request that the user wishes to wait for completion. The moment any one of the control blocks for the I/O requests indicates the I/O request is complete, the aio_suspend( ) function returns to the calling application. If the number of I/O requests that have completed is not the required 30 to 50 percent, the application must again call the aio_suspend( ) function to again wait for the next I/O request in the list of I/O requests to complete. This may result in many calls to the aio_suspend( ) function and many returns to the calling application. Thus, for example, for a set of "n" I/O requests, the last I/O request in the list (n−1) could complete and the aio_suspend( ) function would return to the calling application. On subsequent calls to aio_suspend( ), it is possible that the "n−2" I/O request could complete and then the "n−3" I/O could complete. This results in $n^2$ calls to the aio_suspend( ) function.

Thus, a large amount of overhead costs, in terms of processing time, is encountered with the presently known POSIX asynchronous I/O system calls. Therefore, it would be beneficial to have an apparatus and method for communicating the completion of I/O requests in which the overhead of communicating the completion of the I/O requests is reduced.

SUMMARY OF THE INVENTION

The present invention provides an apparatus and method for communicating the completion of asynchronous I/O requests. In particular, the apparatus and method make use of a new function call which is capable of waiting for a predetermined number of I/O requests to be completed prior to returning to the calling application. Control blocks for the I/O requests are updated after a predetermined number of I/O requests have been completed, i.e. in a process context rather than in an interrupt context as in the known systems. In this way, the overhead associated with known asynchronous I/O system calls is reduced.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 is a flowchart outlining an operation of a calling application in a prior art system for calling an asynchronous I/O suspend function;

FIG. 7 is exemplary pseudo-code for implementing an exemplary embodiment of the present invention on a data processing system.

DETAILED DESCRIPTION OF THE PREFERRED EMBODIMENT

Figure 1:
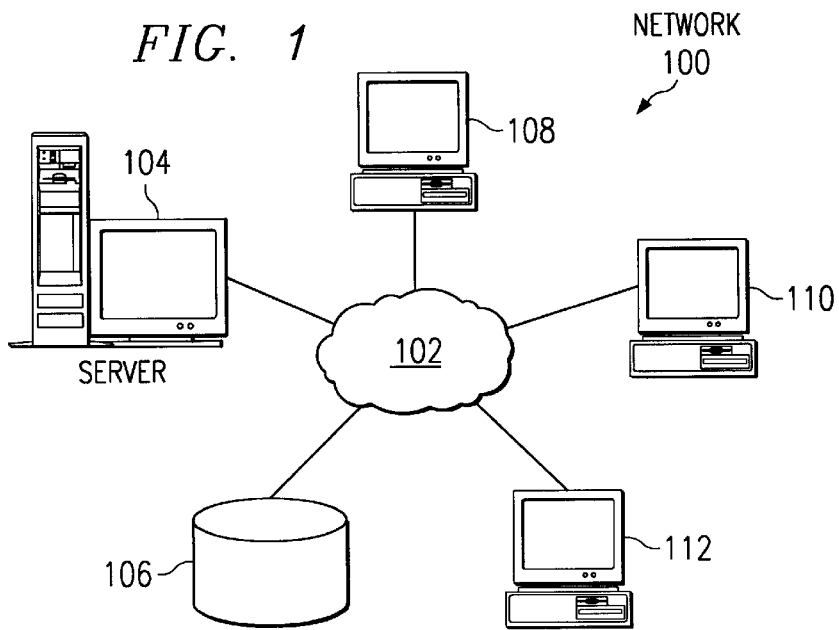
FIG. 1 is an exemplary block diagram of a distributed data processing system according to the present invention.

With reference now to the figures, and in particular with reference to FIG. 1, a pictorial representation of a distributed data processing system in which the present invention may be implemented is depicted. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110, and 112 also are connected to a network 102. These clients 108, 110, and 112 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 108–112. Clients 108, 110, and 112 are clients to server 104. Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational, and other computer systems, that route data and messages. Of course, distributed data processing system 100 also may be implemented as a number of different types of networks, such as, for example, an Intranet or a local area network.

FIG. 1 is intended as an example, and not as an architectural limitation for the processes of the present invention. The present invention may be implemented in the depicted distributed data processing system or modifications thereof as will be readily apparent to those of ordinary skill in the art.

The present invention provides a mechanism for establishing data flow from a trusted server, such as server 104, to a client device, such as client 110, over a non-secure link and still be able to make sure the data has not been changed during transmission. The present invention is applicable to any type of signed and unsigned code that may be transmitted, for example, over the network 102. In the preferred embodiments of the present invention, as described hereafter, a platform independent code will be assumed and specifically, Java code will be assumed for purposes of illustration.

Figure 2A:
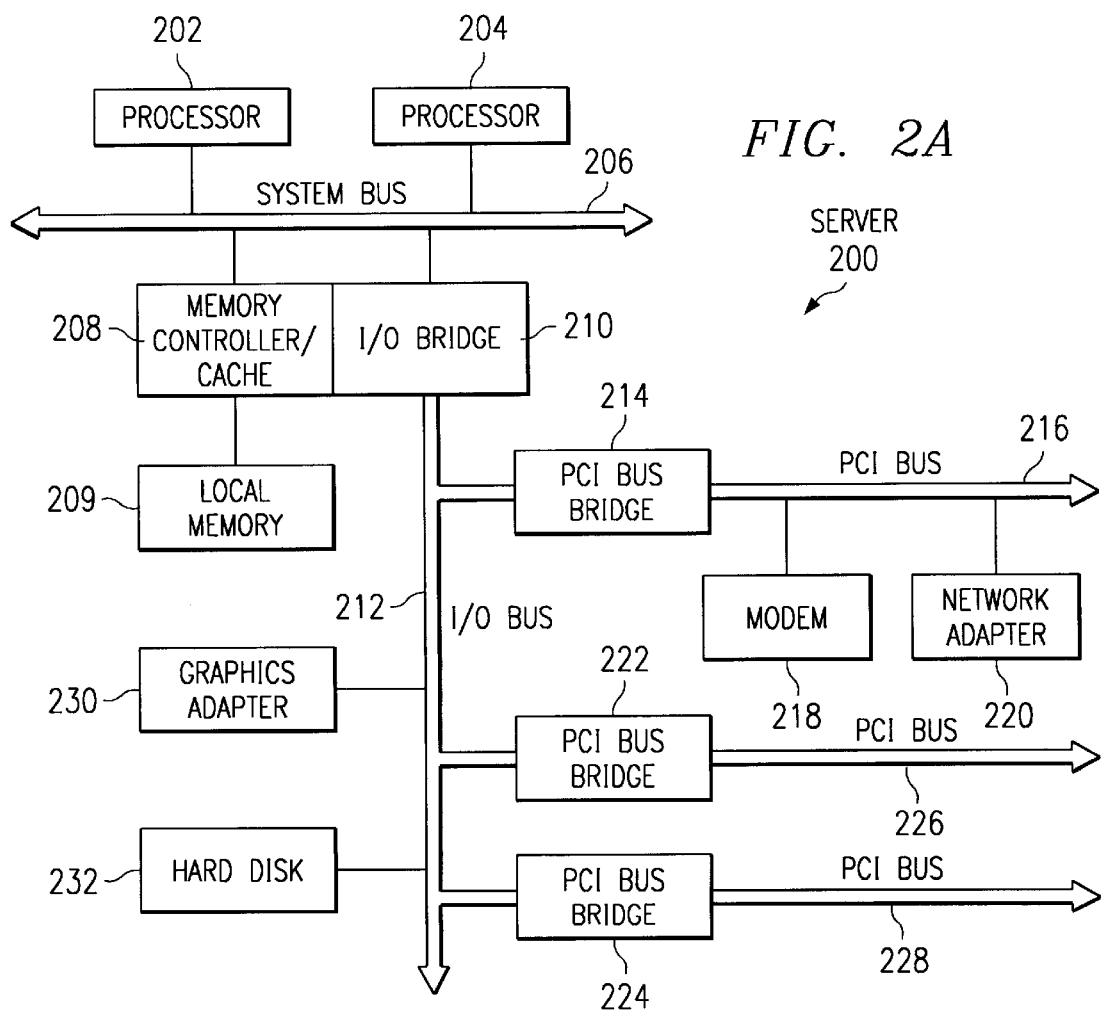
FIG. 2A is an exemplary block diagram of a data processing system according to the present invention.

With reference now to FIG. 2A, a block diagram of a data processing system which may be implemented as a server, such as server 104 in FIG. 1, is depicted in accordance to the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O Bus Bridge 210 is connected to system bus 206 and provides an interface to I/O bus 212. Memory controller/cache 208 and I/O Bus Bridge 210 may be integrated as depicted.

Peripheral component interconnect (PCI) bus bridge 214 connected to I/O bus 212 provides an interface to PCI local bus 216. A modem 218 may be connected to PCI local bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory mapped graphics adapter 230 and hard disk 232 may also be connected to I/O bus 212 as depicted, either directly or indirectly.

Those of ordinary skill in the art will appreciate that the hardware depicted in FIG. 2A may vary. For example, other peripheral devices, such as optical disk drive and the like also may be used in addition or in place of the hardware depicted. The depicted example is not meant to imply architectural limitations with respect to the present invention.

The data processing system depicted in FIG. 2A may be, for example, an IBM RISC/System 6000 system, a product of International Business Machines Corporation in Armonk, N.Y., running the Advanced Interactive Executive (AIX) operating system.

Figure 2B:
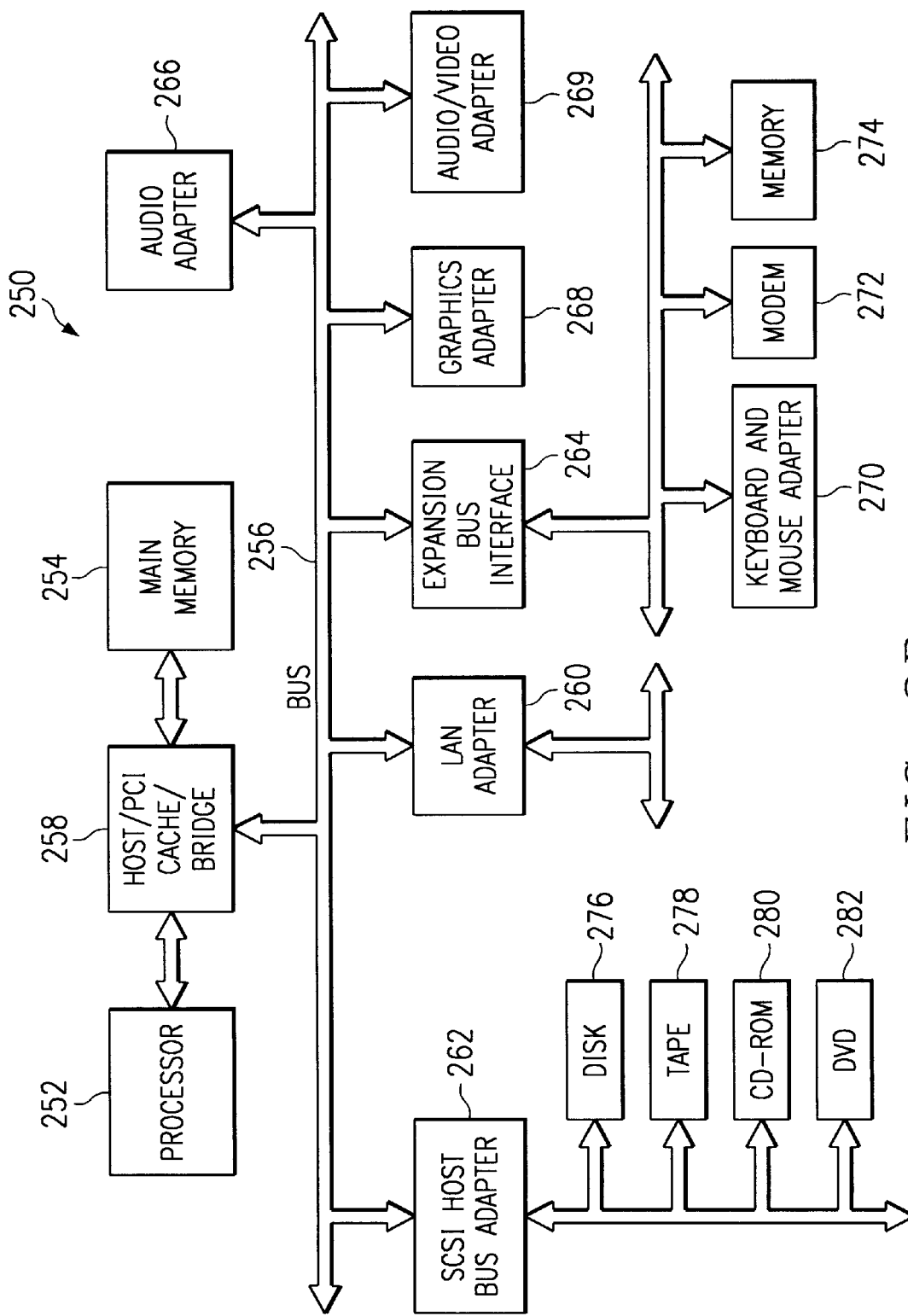
FIG. 2B is an exemplary block diagram of a data processing system according to the present invention.

With reference now to FIG. 2B, a block diagram of a data processing system in which the present invention may be implemented is illustrated. Data processing system 250 is an example of a client computer. Data processing system 250 employs a peripheral component interconnect (PCI) local bus architecture. Although the depicted example employs a PCI bus, other bus architectures such as Micro Channel and ISA may be used. Processor 252 and main memory 254 are connected to PCI local bus 256 through PCI Bridge 258. PCI Bridge 258 also may include an integrated memory controller and cache memory for processor 252. Additional connections to PCI local bus 256 may be made through direct component interconnection or through add-in boards.

In the depicted example, local area network (LAN) adapter 260, SCSI host bus adapter 262, and expansion bus interface 264 are connected to PCI local bus 256 by direct component connection. In contrast, audio adapter 266, graphics adapter 268, and audio/video adapter (A/V) 269 are connected to PCI local bus 266 by add-in boards inserted into expansion slots. Expansion bus interface 264 provides a connection for a keyboard and mouse adapter 270, modem 272, and additional memory 274. SCSI host bus adapter 262 provides a connection for hard disk drive 276, tape drive 278, and CD-ROM 280 in the depicted example. Typical PCI local bus implementations will support three or four PCI expansion slots or add-in connectors.

An operating system runs on processor 252 and is used to coordinate and provide control of various components within data processing system 250 in FIG. 2B. The operating system may be a commercially available operating system such as Java OS or OS/2, which are available from International Business Machines Corporation. Java OS is loaded from a server on a network to a network client and supports Java programs and applets. An object oriented programming system, such as Java, may run in conjunction with the operating system and may provide calls to the operating system from Java programs or applications executing on data processing system 250. Instructions for the operating system, the object-oriented operating system, and applications or programs are located on storage devices, such as hard disk drive 276 and may be loaded into main memory 254 for execution by processor 252. Hard disk drives are often absent and memory is constrained when data processing system 250 is used as a network client.

Those of ordinary skill in the art will appreciate that the hardware in FIG. 2B may vary depending on the implementation. For example, other peripheral devices, such as optical disk drives and the like may be used in addition to or in place of the hardware depicted in FIG. 2B. The depicted example is not meant to imply architectural limitations with respect to the present invention. For example, the processes of the present invention may be applied to a multiprocessor data processing system.

The present invention provides an apparatus and method for communicating the completion of asynchronous input/output (I/O) requests to a calling application. The present invention may be implemented, for example, as software and/or hardware in any type of data processing system. For example, the present invention may be implemented solely in a stand alone computer, such as client computer 110, or in a distributed data processing system using a network, such as network 102.

For example, the present invention may be implemented as software executing on processor 252 in client device 250 or processor 202 or 204 in server device 200. Alternatively, the present invention may be implemented as hardware modules in the client device 250 or server device 200.

For purposes of the description of the preferred embodiments of the present invention, it will be assumed that the present invention is implemented in a distributed data processing system as software running on a processor of a client computer. Furthermore, it will be assumed that the client computer is a POSIX-compliant device that uses the UNIX operating system. However, it should be appreciated that the present invention is not limited to a POSIX-compliant device using the UNIX operating system and is applicable to any computing system using any of a plurality of different operating systems including DOS, Microsoft Windows, OS/2, and the like.

As described above, when an application needs to perform a number of I/O operations, these I/O operations may be performed in an asynchronous manner by submitting batches of I/O requests to the data processing system's operating system. For example, in middleware applications, such as Oracle, many I/O operations may have to be performed to a particular database.

For each I/O operation, a control block is generated. The control block identifies the I/O operation, the address of the page on which the I/O is to operate, who submitted the I/O request, the size of the data to be written/read, whether the I/O operation is a read or a write, and other pertinent information regarding the I/O operation. The control block is used by the operating system to keep track of the status of the I/O operation.

In a POSIX-compliant UNIX system, batches of I/O operations are submitted by an application using system calls that include the lio_listio( ) system call function and the aio_suspend( ) system call function. The lio_listio( ) system call function is used to submit a list of control blocks of I/O requests that are to be completed. The aio_suspend( ) system call function is used to suspend the calling application sending any further I/O requests until a number of existing I/O requests have been completed.

To illustrate the differences between the present invention and the known asynchronous I/O system calls, the operation of the known asynchronous I/O system calls will first be described. Thereafter, the operation the present invention will be described to thereby illustrate how the present invention provides an improvement over the prior art.

As mentioned above, the known asynchronous I/O system calls make use of the POSIX function aio_suspend( ). FIG. 3 is a flowchart outlining the operation of a calling application when calling this aio_suspend( ) function.

As shown in FIG. 3, the operation starts with a list of pending I/O requests being built (step 310). These I/O requests are submitted to the processor as a batch using the system call function lio_listio( ) (step 320). The lio_listio( ) function returns to the calling application once the batch of I/O requests are submitted (step 330).

The system call function aio_suspend( ) is called with the list of pending I/O requests (step 340). The application is then "put to sleep," i.e. suspended, until an I/O request is completed (step 350). If an I/O request is not completed (step 350:NO), the application continues to be in the suspended state.

If an I/O request is completed (step 350:YES), the application traverses the list of pending I/O requests and checks an AIO status flag to see which I/Os were completed (step 360). The application adds the completed I/Os to a "done" list and builds a new list of pending I/Os (step 370).

The application then determines if a predetermined number of I/O requests have been completed (step 380). If not, the application again calls the aio_suspend( ) function (step 340) and the operation is repeated. If a predetermined number of I/O requests have been completed, the application is able to continue with its operations (step 390).

Thus, with the prior art systems, the calling application must perform the monitoring function to determine if a predetermined number of asynchronous I/O requests have been completed. Furthermore, with the prior art systems, many calls must be made to the aio_suspend( ) function in order to wait for a predetermined number of I/O requests to complete.

Figure 4:
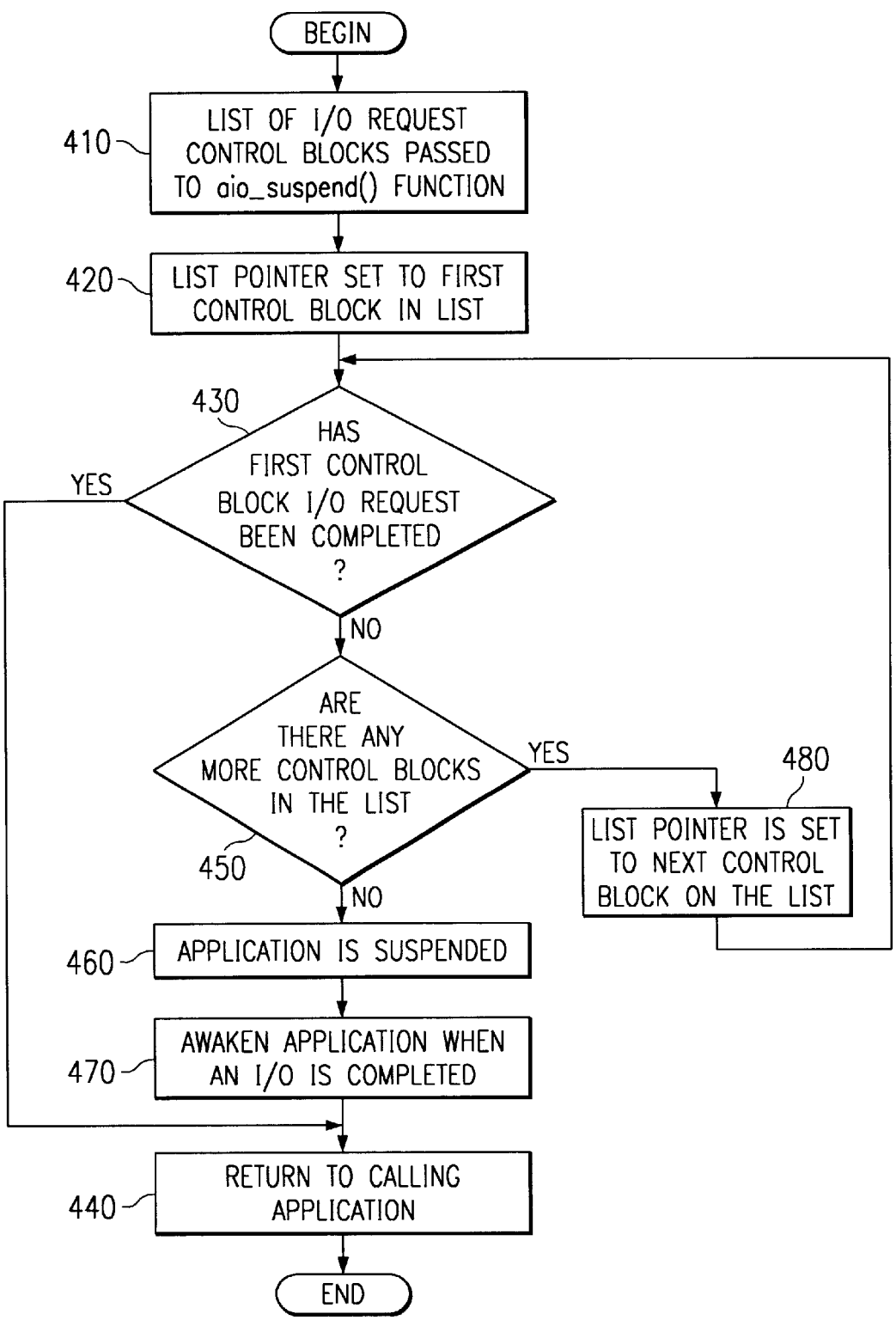
FIG. 4 is a flowchart outlining an operation of the kernel in a prior art system for suspending the operation of a processor.

FIG. 4 is a flowchart outlining the operation of the aio_suspend( ) function as it is implemented in the kernel of the operating system on the data processing system. As shown in FIG. 4, the operation starts with a list of I/O request control blocks being passed to the aio_suspend( ) function (step 410). A list pointer is set to the first control block in the list (step 420). A determination is then made as to whether this first control block I/O request has been completed (step 430). If so, the aio_suspend( ) function returns to the calling application (step 440). This corresponds to step 350 in FIG. 3.

If the I/O request in the first control block in the list has not completed, a determination is made as to whether there are more control blocks in the list (step 450). If not, the application is suspended (step 460). When any I/O request on the control blocks in the list is complete, the application is awakened and the aio_suspend( ) function returns to the calling application (step 470). If there are more control blocks in the list, the list pointer is set to the next control block on the list (step 480) and the operation returns to step 430.

Thus, with the prior art systems, the list of control blocks must be traversed each time the aio_suspend( ) function is called. Thus, the processor must inspect each control block to determine if its corresponding I/O request has been completed. If none of the I/O requests have been completed, the application is suspended until an I/O request is completed. Once an I/O request is completed, the aio_suspend( ) function returns to the calling application which, if the predetermined number of I/O requests have not been completed, again calls the aio_suspend( ) function and the operation is repeated.

Figure 5:
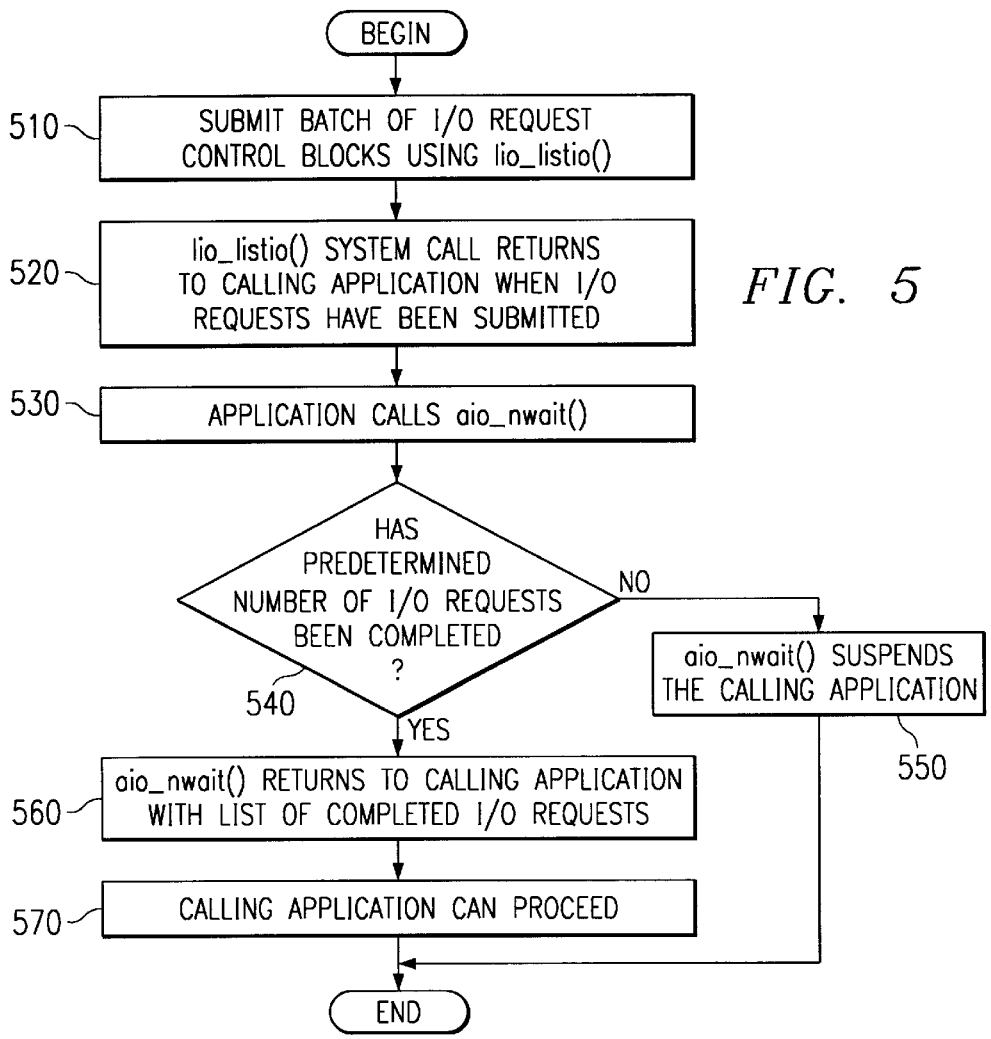
FIG. 5 is flowchart outlining an exemplary operation of the a calling application in accordance with the present invention.

FIG. 5 is a flowchart outlining an exemplary operation of a calling application in accordance with the present invention. In the exemplary implementation shown in FIG. 5, the wait function of the present invention is termed the "aio_nwait( )" function.

As shown in FIG. 5, the operation starts with a batch of I/O request control blocks being submitted using the lio_listio( ) system call (step 510). The lio_listio( ) system call returns to the calling application when the I/O requests have been submitted (step 520). The application then calls the aio_nwait( ) function (step 530).

The aio_nwait( ) function waits until a predetermined number of I/O requests have been completed (step 540). If a predetermined number of I/O requests have not been completed, aio_nwait( ) suspends the calling application (step 550) and returns to step 540. If a predetermined number of I/O requests have been completed, aio_nwait( ) returns to the calling application with a list of the I/O requests that were completed (step 560) and the calling application can then proceed (step 570).

Thus, with the present invention, only one call to the aio_nwait( ) function is necessary for a list of I/O requests that are to be completed. Only when a predetermined number of I/O requests have been completed will the aio_nwait( ) function return to the calling application. Thus, the list of control blocks for I/O requests is updated only after a predetermined number of I/O requests have been completed, rather than with every instance of a completed I/O request. In this way, the overhead associated with monitoring I/O requests is reduced.

Figure 6:
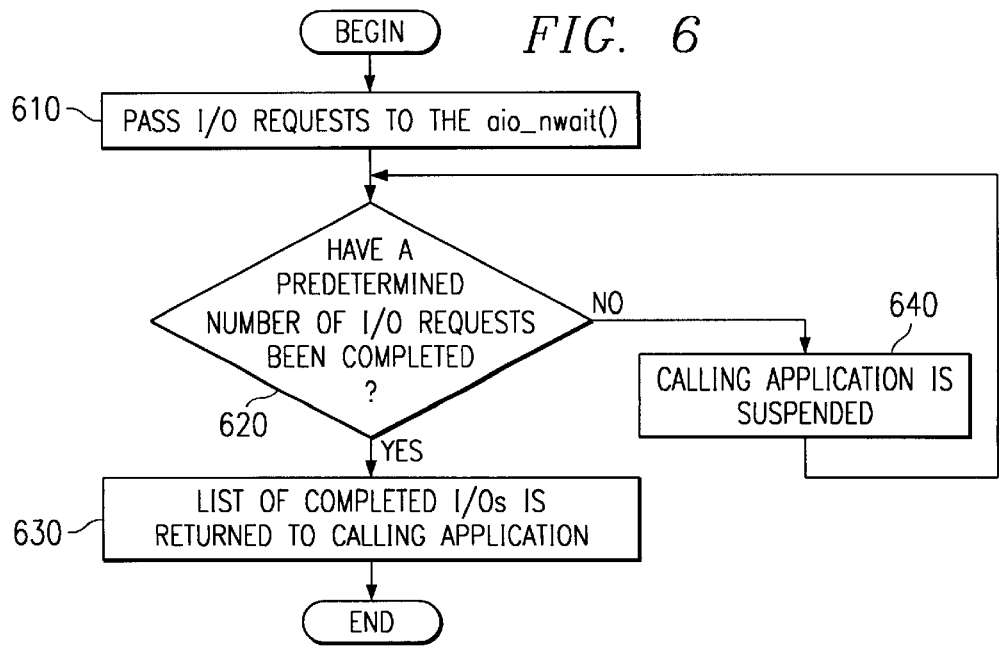
FIG. 6 is a flowchart outlining an exemplary operation of the kernel of a data processing system in accordance with the present invention.

FIG. 6 is a flowchart outlining an exemplary operation of the aio_nwait( ) system call function in accordance with the present invention. The operation starts with a number of I/O requests being passed to the aio_nwait( ) function (step 610). A determination is made as to whether or not a predetermined number of I/O requests have been completed (step 620). If a predetermined number of I/O requests have been completed, the operation returns a list of I/Os that were completed to the calling application and the operation ends (step 630).

If a predetermined number of I/O requests have not been completed, the calling application is suspended (step 640). The operation then returns to step 620. Once a predetermined number of I/O requests have been completed, the calling application is awaken and the list of completed I/O requests is returned to the calling application (step 630).

The above exemplary embodiments of the present invention make reference to a predetermined number of I/O requests being completed. This predetermined number of I/O requests may be arbitrarily set by a user, the calling application, or some other entity associated with the data processing system. For example, the predetermined number of I/O requests may be set to n/2, n/3n, or the like, where n is the total number of I/O requests to be completed. Any predetermined number may be used without departing from the spirit and scope of the present invention.

FIG. 7 illustrates exemplary pseudo-code for implementing an exemplary embodiment of the present invention. As is apparent to those of ordinary skill in the art, the pseudo-code in FIG. 7 is only one possible implementation of the present invention and other software and/or hardware implementations may be used without departing from the spirit and scope of the present invention.

FIG. 7 provides an example of how the present invention may be utilized to handle I/O threads in a data processing system. A thread is the element of a program which is scheduled to the central processing unit. A thread is a part of a program that can execute independently of other parts.

As shown in FIG. 7, the aio_nwait( ) system call function takes as arguments the predetermined number of I/O requests to wait on, a pointer to a list of each I/O request that is completed that will be filled by the kernel, and a count of the maximum number of entries that can be on the list. At first, the application input/output (AIO) kernel extension configuration is checked. The AIO kernel extension is a part of the operating system that provides asynchronous input/output services. If the AIO kernel extension is not configured, an error message is returned to the calling application.

The arguments passed into aio_nwait( ) are then checked to determine if they are valid. If any of the arguments are invalid, an error message is returned to the calling application. The thread ID of the caller is then determined. The thread ID is a number that identifies a thread. When a program is run on a data processing system, a thread is the entity of the program that is scheduled and dispatched to the central processing unit. Every thread has a unique integer ID used to identify the thread, i.e. The thread ID.

Once the thread ID is determined, it is used to examine the thread's aio_done field. Every thread has a data block known as a structure which has various elements. Each element is known as a field in the structure and each element or field is used for a particular purpose. For example, one of the fields is the thread ID which identifies the thread. Another field is labeled aio_done which indicates the number of asynchronous I/Os (AIOs) that have been completed for this thread.

The aio_done value obtained from the thread's aio_done field is then compared to the nwait value. If aio_done is less than the nwait value, then the calling thread is suspended using the kernel thread wait routine. The thread wait routine returns after aio_done is equal to nwait. Once aio_done is equal to nwait, the pointer to the list of control blocks is modified so that each control block that was done is added to the list. This list of control blocks is copied out to the user space and the calling application is awaken and control is returned to it.

Thus, the present invention provides a mechanism by which overhead in monitoring and communicating the completion of asynchronous I/O requests is minimized. The present invention provides a mechanism by which control is returned to a calling application only when a predetermined number of I/O requests are completed. Therefore, the list of control blocks associated with I/O requests that have been completed are only updated when the predetermined number of I/O requests are completed and not at each instance an I/O request is completed. Thereby, the number of system function calls is reduced.

In an alternative embodiment, the present invention provides a mechanism by which a batch of I/O requests may be submitted, the aio_nwait( ) function may be called, and additional new I/O requests added to the batch of I/O requests pending in the aio_nwait( ) function as already existing I/O requests in the batch are completed. In this alternative embodiment, rather than waiting for a particular predetermined number of I/O requests to complete before returning to the calling application, as each I/O request in the batch is completed, the aio nwait( ) function returns to the calling application an indicator of the control block corresponding to the I/O request that was completed.

In addition, an indicator is provided to the calling application that an additional new I/O request may be added to the batch of I/O requests still pending in the aio_nwait( ) function. In response, the calling application creates a control block for the new I/O request and sends it to the aio_nwait( ) function for inclusion in the already existing I/O request batch. Similarly, if two or more I/O requests are completed within a computing cycle, the aio_nwait( ) function would return indicators of the control blocks of the I/O requests that were completed and inform the calling application of the ability to receive a similar number of new I/O requests for addition to the already existing I/O request batch.

In this way, the aio_nwait( ) function is not fully exited until all pending I/O requests have been completed. I/O requests are passed into the aio_nwait( ) function as additional capacity to handle the I/O requests becomes available. This embodiment is different from the conventional aio_suspend( ) function in that the aio_suspend( ) function, while exiting to the calling function with each completed I/O request, does not allow new I/O requests to be added to the existing I/O request batch until a predetermined number of the I/O requests in the batch are completed.

It is important to note that while the present invention has been described in the context of a fully functioning data processing system, thoseof ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of communicating the completion of input/output (I/O) requests to a calling application, comprising:
   submitting a batch of I/O requests from the calling application to an operating system;
   calling a wait function in response to the batch of I/O requests being submitted, wherein the wait function causes a processor to suspend submitting additional I/O requests until a predetermined number of I/O requests in the batch of I/O requests are completed;
   determining if a predetermined number of I/O requests in the batch of I/O requests have completed, wherein the predetermined number of I/O requests is two or more I/O requests; and
   returning control, from the wait function, to the calling application only when the predetermined number of I/O requests in the batch of I/O requests have completed.

2. The method of claim 1, further comprising updating a list of control blocks associated with the I/O requests only after the predetermined number of I/O requests have been completed.

3. The method of claim 1, wherein the method is implemented on a POSIX-complaint data processing system using a UNIX operating system.

4. The method of claim 1, wherein the batch of I/O requests is a group of two or more asynchronous I/O requests submitted by the calling application to the operating system.

5. The methods of claim 1, wherein the batch of I/O requests are submitted using a lio_listio( ) system call function.

6. The method of claim 1, wherein the method is implemented in a distributed data processing system.

7. The method of claim 1, wherein the method is implemented in a stand alone data processing system.

8. The methods of claim 1, wherein returning control, from the wait function, to the calling application includes returning a list of I/O that have been completed to the application.

9. The method of claim 1, wherein calling a wait function includes passing to the wait function as parameters a predetermined number of I/O requests to wait on, a pointer to a list for identifying completed requests, and a count of a maximum number of entries that can be in the list.

10. The method of claim 1, wherein calling a wait function includes identifying a thread ID of a calling thread of the calling application that called the wait function and wherein determining if a predetermined number of I/O requests have completed includes:
    examining a number of asynchronous input/output operations completed for the calling thread; and
    comparing the number of asynchronous input/output operations completed for the calling thread to a predetermined number of I/O requests to wait on.

11. The method of claim 10, wherein returning control to the calling application includes modifying a pointer to a list of control blocks so that each control block corresponding to an I/O operation that was completed is indicated as having been completed.

12. The method of claim 11, wherein returning control to the calling application further includes copying the list of control blocks out to a user space and awakening the calling application.

13. A computer program product in a computer readable medium for communicating the completion of input/output (I/O) requests to a calling application, comprising:
    first instructions for submitting a batch of I/O requests from the calling application to an operating system;
    second instructions for calling a wait function in response to the batch of I/O requests being submitted, wherein the wait function causes a processor to suspend submitting additional I/O requests until a predetermined number of I/O requests in the batch of I/O requests are completed;
    third instructions for determining if a predetermined number of I/O requests in the batch of I/O requests have completed, wherein the predetermined number of I/O requests have completed.
    third eourth instrucilions eor returning control, from the wait function, to the calling application only when the predetermined numder of I/O requests in the batch of I/O requests have completed.

14. The computer program product of claim 13, further comprising fifth instructions for updating a list of control blocks associated with the I/O requests only after the predetermined number of I/O requests have been completed.

15. The computer program product of claim 13, wherein the computer program product is executed in a POSIX-compliant data processing system using a UNIX operating system.

16. The computer program product of claim 13, wherein the batch of I/O requests is a group of two or more asynchronous I/O requests submitted by the calling application to an the operating system.

17. The computer program product of claim 13, wherein the first instructions include instructions for submitting the batch of I/O requests using a lio_listio( ) system call function.

18. The computer program product of claim 13, wherein the fourth instructions for returning control, from the wait function, to the calling application includes instructions for returning a list of I/Os that have been completed to the calling application.

19. The computer program product of claim 13, wherein the second instructions for calling a wait function include instructions for passing to the wait function as parameters a predetermined number of I/O requests to wait on, a pointer to a list for identifying completed requests, and a count of a maximum number of entries that can be in the list.

20. The computer program product of claim 13, wherein the second instructions for calling a wait function include instructions for identifying a thread ID of a calling thread of the calling application that called the wait function, and wherein the second instructions for determining if a predetermined number of I/O requests have completed includes:

instructions for examining a number of asynchronous input/output operations completed for the calling thread; and instructions for comparing the number of asynchronous input/output operations completed for the calling thread to a predetermined number of I/O requests to wait on.

21. The computer program product of claim 20, wherein the fourth instructions for returning control to the calling application include instructions for modifying a pointer to a list of control blocks so that each control block corresponding to an I/O operation that was completed is indicated as having been completed.

22. The computer program product of claim 21, wherein the fourth instructions for returning control to the calling application further include instructions for copying the list of control blocks out to a user space and instructions for awakening the calling application.

23. An apparatus for communicating the completion of input/output (I/O) requests to a calling application, comprising:

means for submitting a batch of I/O requests from the calling application to an operating system;

means for calling a wait function in response to the batch of I/O requests being submitted, wherein the wait function causes a processor to suspend submitting additional I/O requests until a predetermined number of I/O requests in the batch of I/O requests are completed;

means for determining if a predetermined number of I/O requests in the batch of I/O requests have completed, wherein the predetermined number or I/O requests is two or more I/O requests; and means for returning control, from the wait function, to the calling application only when the predetermined number of I/O requests in the batch of I/O requests have completed.

24. The apparatus of claim 23, further comprising means for updating a list of control blocks associated with the I/O requests only after the predetermined number of I/O requests have been completed.

25. The apparatus of claim 23, wherein the apparatus is a POSIX-compliant data processing system using a UNIX operating system.

26. The apparatus of claim 23, wherein the batch of I/O requests is a group of two or more asynchronous I/O requests submitted by the calling application to the operating system.

27. The apparatus of claim 23, wherein the batch of I/O requests are submitted using a lio_listio( ) system call function.

28. The apparatus of claim 23, wherein the apparatus is a distributed data processing system.

29. The apparatus of claim 23, wherein the apparatus is a stand alone data processing system.

30. The apparatus of claim 23, wherein the means for returning control, from the wait function, to the calling application includes means for returning a list of I/Os that have been completed to the calling application.

31. The apparatus of claim 23, wherein the means for calling a wait function includes means for passing to the wait function as parameters a predetermined number of I/O requests to wait on, a pointer to a list for identifying completed requests, and a count of a maximum number of entries that can be in the list.

32. The apparatus of claim 23, wherein the means for calling a wait function includes means for identifying a thread ID of a calling thread of the calling application that called the wait function, and wherein the means for determining if a predetermined number of I/O requests have completed includes:

means for examining a number of asynchronous input/output operations completed for the calling thread; and means for examining the number of asynchronous input/output operations completed for the calling thread to a predetermined number of I/O requests to wait on.

33. The apparatus of claim 32, wherein the means for returning control to the calling application includes means for modifying a pointer to a list of control blocks so that each control block corresponding to an I/O operation that was completed is indicated as having been completed.

34. The apparatus of claim 33, wherein the means for returning control to the calling application further includes means for copying the list of control blocks out to a user space and means for awakening the calling application.

35. A method of communicating the completion of input/output (I/O) requests to a calling application, comprising:

calling a wait function, wherein the wait function causes a processor to suspend submitting additional I/O requests until an I/O request is completed from a batch of I/O requests;

determining if an I/O request is completed from the batch of I/O requests; and returning to the calling application, information identifying the I/O request that is completed and instructing the calling application to submit a new I/O request for inclusion in the batch of I/O requests.

* * * * *